(12) United States Patent
Liao

(10) Patent No.: US 11,520,187 B2
(45) Date of Patent: Dec. 6, 2022

(54) LIQUID CRYSTAL DISPLAY PANEL AND LIQUID CRYSTAL DISPLAY DEVICE

(71) Applicant: TCL China Star Optoelectronics Technology Co., Ltd., Shenzhen (CN)

(72) Inventor: Huihua Liao, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 196 days.

(21) Appl. No.: 16/623,400

(22) PCT Filed: Nov. 28, 2019

(86) PCT No.: PCT/CN2019/121418
§ 371 (c)(1),
(2) Date: Dec. 17, 2019

(87) PCT Pub. No.: WO2021/068379
PCT Pub. Date: Apr. 15, 2021

(65) Prior Publication Data
US 2021/0333597 A1    Oct. 28, 2021

(30) Foreign Application Priority Data
Oct. 11, 2019 (CN) .......................... 201910963794.4

(51) Int. Cl.
*G02F 1/1339* (2006.01)
(52) U.S. Cl.
CPC ...... *G02F 1/13394* (2013.01); *G02F 1/13396* (2021.01); *G02F 1/13398* (2021.01)

(58) Field of Classification Search
CPC ............. G02F 1/13394; G02F 1/13396; G02F 1/13398; G02F 1/1347; G02F 1/1339; G02F 1/13392
See application file for complete search history.

(56) References Cited

U.S. PATENT DOCUMENTS

| | | | | |
|---|---|---|---|---|
| 2006/0267969 | A1* | 11/2006 | Doi | G02F 1/133512 345/204 |
| 2014/0057520 | A1 | 2/2014 | Zhao | |
| 2015/0029432 | A1* | 1/2015 | Ishikawa | G02F 1/13394 349/43 |
| 2016/0070127 | A1* | 3/2016 | Ishikawa | G02F 1/1368 349/42 |
| 2016/0282655 | A1* | 9/2016 | Yu | G02F 1/13394 |
| 2017/0168342 | A1* | 6/2017 | Park | G02F 1/13475 |
| 2018/0210259 | A1 | 7/2018 | Gao et al. | |

(Continued)

FOREIGN PATENT DOCUMENTS

| | | |
|---|---|---|
| CN | 101900911 | 12/2010 |
| CN | 103913901 | 7/2014 |
| CN | 204331233 | 5/2015 |

(Continued)

*Primary Examiner* — Jia X Pan
(74) *Attorney, Agent, or Firm* — PV IP PC; Wei Te Chung; Ude Lu

(57) ABSTRACT

A liquid crystal display panel and a liquid crystal display device are provided. The liquid crystal display panel includes a substrate comprising a first substrate and a second substrate, a plurality of spacers comprising a plurality of first spacers and a plurality of second spacers, and at least one retaining wall disposed between the first spacer and the second spacer or between the second spacers.

8 Claims, 3 Drawing Sheets

(56) References Cited

U.S. PATENT DOCUMENTS

2019/0369431 A1* 12/2019 Chan ................... G02F 1/13394
2020/0091596 A1* 3/2020 Lin ....................... H01Q 1/364

FOREIGN PATENT DOCUMENTS

| CN | 105137666 | 12/2015 |
| CN | 105259711 A * | 1/2016 |
| CN | 205862059 | 1/2017 |
| CN | 105974631 | 4/2019 |
| CN | 203673188 | 4/2020 |
| WO | WO 2016208199 | 12/2016 |

* cited by examiner

LIQUID CRYSTAL DISPLAY PANEL AND LIQUID CRYSTAL DISPLAY DEVICE

RELATED APPLICATIONS

This application is a National Phase of PCT Patent Application No. PCT/CN2019/121418 having International filing date of Nov. 28, 2019, which claims the benefit of priority of Chinese Patent Application No. 201910963794.4 filed on Oct. 11, 2019. The contents of the above application are all incorporated by reference as if fully set forth herein in their entirety.

FIELD AND BACKGROUND OF THE INVENTION

The present disclosure relates to the field of display technologies, and more particularly to a liquid crystal display panel and a liquid crystal display device.

In liquid crystal display panels of liquid crystal display devices, surfaces of two transparent insulating substrates are disposed opposite to each other, electrodes that generate an electric field are formed on the surfaces of substrates disposed opposite to each other, and a liquid crystal material is injected between the substrates. Then, the electric field is generated by applying a voltage to electrodes on the surfaces of the substrates to change an alignment direction of liquid crystal molecules. Therefore, amount of light transmitted through the transparent insulating substrates can be controlled, thereby obtaining an image desired to be displayed. The liquid crystal display devices with the above structure generally include thin film transistors (TFTs) as switching elements, and thus are also referred to as thin film transistor liquid crystal displays (TFT-LCDs).

In order to allow liquid crystal to be injected between upper and lower substrates of the display, a support needs to be provided between the upper and lower substrates to provide a required cell gap. The support is generally called a spacer, and is usually located above data lines and scan lines. The support does not affect a displayed image and only provides space to prevent the upper and lower substrates from contacting. Generally, material of the spacer is a photosensitive resin such as acrylic resin, that is, a photo spacer (PS), and a shape thereof is spherical, columnar, or trapezoidal, and is formed by a photolithography process.

Current LCD panels will simulate reliability of actual uses under high temperature environment. The panel is placed vertically, and a volume of the liquid crystal will expand at high temperature, which will cause the cell gap of the panel to become larger. Liquid crystal material will accumulate on a bottom of the liquid crystal panel due to gravity, resulting in abnormally large partial cell gap, uneven brightness and darkness of the panel, and gravity mura.

SUMMARY OF THE INVENTION

Embodiments of the present invention provide a liquid crystal display panel and a liquid crystal display device, which can block part of liquid crystal from flowing to a bottom of the liquid crystal panel due to gravity, so as to solve issues that existing liquid crystal material will be accumulated on the bottom of the liquid crystal panel due to gravity, resulting in abnormally large partial cell gap, uneven brightness and darkness of the panel, and gravity mura.

To solve the above issues, an embodiment of the present application provides a liquid crystal display panel. The liquid crystal display panel comprises a display area; a non-display area; a substrate comprising a first substrate and a second substrate, the first substrate being disposed opposite to the second substrate; a plurality of spacers comprising a plurality of first spacers and a plurality of second spacers, wherein the first spacers are disposed in the non-display area, at least a portion of each of the first spacers is in contact with the first substrate and the second substrate, and each of the second spacers is disposed between the first spacer and the display area; and at least one retaining wall disposed between the first spacer and the second spacer or between the second spacers.

In some embodiments of the present application, the at least one retaining wall is disposed in the non-display area.

In some embodiments of the present application, a height of the at least one retaining wall is lower than a height of the first spacer.

In some embodiments of the present application, a height of the at least one retaining wall is lower than a height of the second spacer.

In some embodiments of the present application, the at least one retaining wall comprises at least two layers of retaining walls.

In some embodiments of the present application, heights of the at least two layers of the retaining walls are same.

In some embodiments of the present application, a distance between the at least two layers of the retaining walls and a bottom of the liquid crystal display panel and the heights of the at least two layers of the retaining walls satisfy following formula: $H=A/D$; where D is the distance between the at least two layers of the retaining walls and the bottom of the liquid crystal display panel, H is the heights of the at least two layers of the retaining walls, and A is a preset fixed value.

In some embodiments of the present application, material of the at least one retaining wall comprises a photoresist material.

In some embodiments of the present application, the at least one retaining wall has a circular, rectangular, triangular, or trapezoidal shape.

In some embodiments of the present application, a width of the at least one retaining wall is less than widths of the first spacer and the second spacer.

An embodiment of the present application further provides a liquid crystal display device comprising a liquid crystal display panel. The liquid crystal display panel comprises a display area; a non-display area; a substrate comprising a first substrate and a second substrate, the first substrate being disposed opposite to the second substrate; a plurality of spacers comprising a plurality of first spacers and a plurality of second spacers, wherein the first spacers are disposed in the non-display area, at least a portion of each of the first spacers is in contact with the first substrate and the second substrate, and each of the second spacers is disposed between the first spacer and the display area; and at least one retaining wall disposed between the first spacer and the second spacer or between the second spacers.

In some embodiments of the present application, the at least one retaining wall is disposed in the non-display area.

In some embodiments of the present application, a height of the at least one retaining wall is lower than a height of the first spacer.

In some embodiments of the present application, a height of the at least one retaining wall is lower than a height of the second spacer.

In some embodiments of the present application, the at least one retaining wall comprises at least two layers of retaining walls.

In some embodiments of the present application, heights of the at least two layers of the retaining walls are same.

In some embodiments of the present application, a distance between the at least two layers of the retaining walls and a bottom of the liquid crystal display panel and the heights of the at least two layers of the retaining walls satisfy following formula: H=A/D; where D is the distance between the at least two layers of the retaining walls and the bottom of the liquid crystal display panel, H is the heights of the at least two layers of the retaining walls, and A is a preset fixed value.

In some embodiments of the present application, material of the at least one retaining wall comprises a photoresist material.

In some embodiments of the present application, the at least one retaining wall has a circular, rectangular, triangular, or trapezoidal shape.

In some embodiments of the present application, a width of the at least one retaining wall is less than widths of the first spacer and the second spacer.

Beneficial effects of the present application are that: compared with existing liquid crystal display panels and liquid crystal display devices, the liquid crystal display panel of an embodiment of the present invention adds at least a section of retaining wall between the spacers, and the retaining wall can not affect characteristics of the spacer and light transmission performance of the liquid crystal display panel, and does not need to add other processes. When the liquid crystal display panel is placed vertically, the retaining wall blocks part of the liquid crystal from flowing to a bottom of the liquid crystal display panel due to gravity, improving a cell gap and brightness uniformity of the panel, relieving gravity mura, and improving a display performance of a product.

BRIEF DESCRIPTION OF SEVERAL VIEWS OF DRAWINGS

In order to explain technical solutions in embodiments of the present invention more clearly, drawings used in the description of the embodiments will be briefly introduced below. Obviously, the drawings in the following description are only some embodiments of the present invention. For those skilled in the art, other drawings can be obtained based on these drawings without paying creative work.

DESCRIPTION OF EMBODIMENTS OF THE INVENTION

Figure 1:
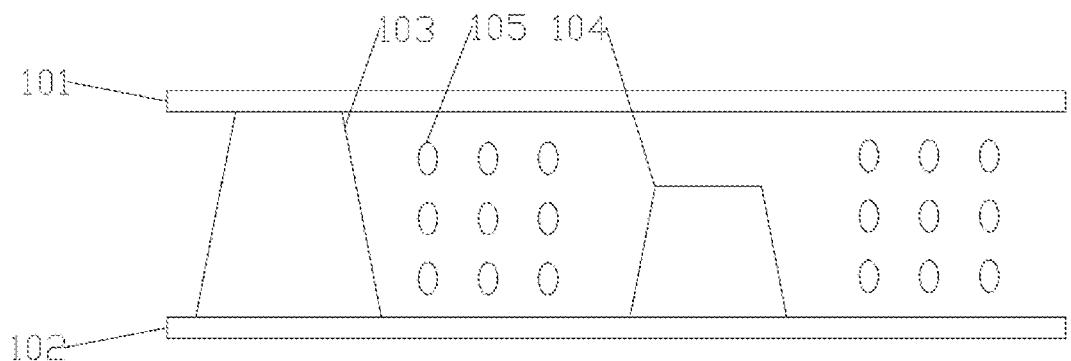
FIG. 1 is a schematic cross-sectional structure diagram of a liquid crystal display panel in the prior art.

The technical solutions in the embodiments of the present invention will be clearly and completely described below with reference to the drawings in the embodiments of the present invention. Obviously, the described embodiments are only a part of the embodiments of the present invention, but not all the embodiments. Based on the embodiments of the present invention, all other embodiments obtained by those skilled in the art without creative work fall into the protection scope of the present invention.

In the description of the present invention, it should be understood that the terms "center", "longitudinal", "transverse", "length", "width", "thickness", "upper", "lower", "front", "back", "left", "right", "vertical", "horizontal", "top", "bottom", "inside", "outside", etc. indicating directions or position relationships are based on directions or position relationships shown in the drawings, are only for the convenience of describing the present invention and simplifying the description, and do not indicate or imply that the device or element referred to must have a specific orientation, be constructed and operate in a specific orientation, and therefore cannot be understood as a limitation on the present invention. Moreover, the terms "first" and "second" are used for descriptive purposes only and are not to be construed as indicating or implying a relative importance or implicitly indicating the number of technical features indicated. Therefore, the features defined as "first" and "second" may explicitly or implicitly include one or more of the features. In the description of the present invention, the meaning of "a plurality" is two or more unless specifically defined otherwise.

In this application, the word "exemplary" is used to mean "serving as an example, illustration, or explanation." Any embodiment described as "exemplary" in this application is not necessarily to be construed as preferred or advantageous over other embodiments. In order to enable any person skilled in the art to implement and use the present invention, the following description is given. In the following description, details are set forth for the purpose of explanation. It should be understood by one of ordinary skill in the art that the present invention may be implemented without the use of these specific details. In other instances, well-known structures and procedures are not described in detail to avoid obscuring the description of the present invention with unnecessary details. Accordingly, the present invention is not intended to be limited to the embodiments shown, but is to be accorded the widest scope consistent with the principles and features disclosed herein.

As shown in FIG. 1, which is a schematic cross-sectional structure diagram of a liquid crystal display panel in the prior art. The liquid crystal display panel includes a display area and a non-display area. The liquid crystal display panel includes a color filter substrate 101, an array substrate 102, a main spacer 103, an auxiliary spacer 104, and liquid crystal 105. The main spacer 103 is disposed in the non-display area, and the auxiliary spacer 104 is disposed between the main spacer 103 and the display area. The liquid crystal 105 is filled between the main spacer 103 and the auxiliary spacer 104, and the color filter substrate 101 is disposed opposite to the array substrate 102. At present, the liquid crystal display panel will simulate reliability of actual use in a high temperature environment. The liquid crystal display panel is placed vertically, and a volume of the liquid crystal 105 expands at high temperatures, resulting in a large liquid crystal layer gap (also called a cell gap) of the liquid crystal display panel. When the liquid crystal display panel is placed vertically, the liquid crystal 105 will accumulate on a bottom of the liquid crystal display panel due to gravity, resulting in abnormally large partial cell gap, uneven brightness and darkness of the panel, and gravity mura.

Based on this, it is found that the liquid crystal 105 is subjected to gravity to flow downward from an accommodation space between the main spacer 103 and the auxiliary spacer 104. Therefore, embodiments of the present invention provide a liquid crystal display panel and a liquid crystal display device, which will be described in detail below respectively.

First, an embodiment of the present application provides a liquid crystal display panel. The liquid crystal display panel comprises a display area; a non-display area; a substrate comprising a first substrate and a second substrate, the first substrate being disposed opposite to the second substrate; a plurality of spacers comprising a plurality of first spacers and a plurality of second spacers, wherein the first spacers are disposed in the non-display area, at least a portion of each of the first spacers is in contact with the first substrate and the second substrate, and each of the second spacers is disposed between the first spacer and the display area; and at least one retaining wall disposed between the first spacer and the second spacer or between the second spacers.

Figure 2:
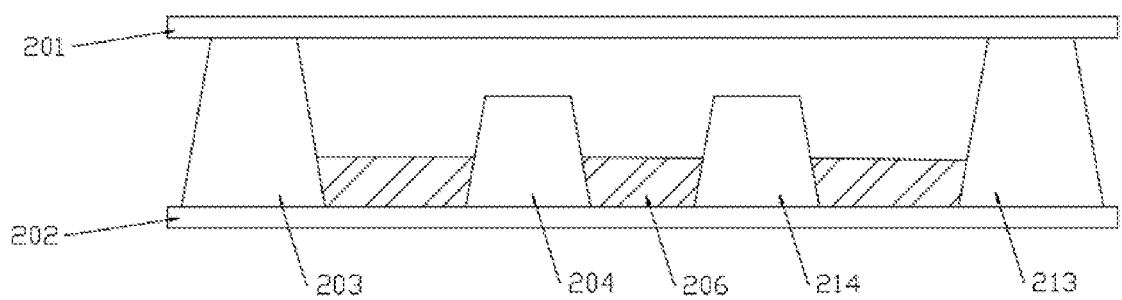
FIG. 2 is a schematic cross-sectional structure diagram of a liquid crystal display panel according to an embodiment of the present invention.

As shown in FIG. 2, which is a schematic cross-sectional structure diagram of a liquid crystal display panel according to an embodiment of the present invention. The liquid crystal display panel comprises a display area; a non-display area; a substrate comprising a first substrate 201 and a second substrate 202, the first substrate 201 being disposed opposite to the second substrate 202; a plurality of spacers comprising a plurality of first spacers and a plurality of second spacers, wherein the first spacers 203 and 213 are disposed in the non-display area, at least a portion of each of the first spacers is in contact with the first substrate 201 and the second substrate 202, and each of the second spacers 204 and 214 is disposed between the first spacer 203 and the display area; and at least one retaining wall 206 disposed between the first spacer 203 and the second spacer 204, the second spacer 204 and the second spacer 214, and between the first spacer 213 and the second spacers 214.

In an embodiment of the present invention, the retaining wall 206 is added between the first spacer 203 and the second spacer 204, between the second spacer 204 and the second spacer 214, and between the first spacer 213 and the second spacer 214 (although 206 in the figure is only marked in one shade, as can be seen from the foregoing, all three shades can be referred to), so that when the liquid crystal display panel is placed vertically, the retaining wall 206 blocks part of the liquid crystal from flowing to a bottom of the liquid crystal display panel due to gravity, improving a cell gap and brightness uniformity of the panel, relieving gravity mura, and improving a display performance of a product.

In a liquid crystal display panel, generally, the first spacer 203 and the second spacer 204 are disposed between the first substrate 201 and the second substrate 202. The first spacer 203 and the second spacer 204 play a role of supporting a substrate gap, and improve uniformity of a cell thickness of a sealant area. A height of the first spacer 203 ranges from 2 um to 5 um, preferably 2.2 um to 3 um, and most preferably 2.52 um. A height of the second spacer 204 ranges from 1 um to 3 um, preferably 2 um to 2.5 um, and most preferably 2.12 um. In order not to affect characteristics of the first spacer 203 and the second spacer 204, preferably, a height of the retaining wall 206 is lower than the height of the first spacer 203. Similarly, it can be understood that the height of the retaining wall 206 is lower than the height of the second spacer 204.

In this embodiment, the retaining wall 206 is disposed in the non-display area, which can prevent the retaining wall 206 from affecting light transmission performance of the liquid crystal display panel.

Figure 3:
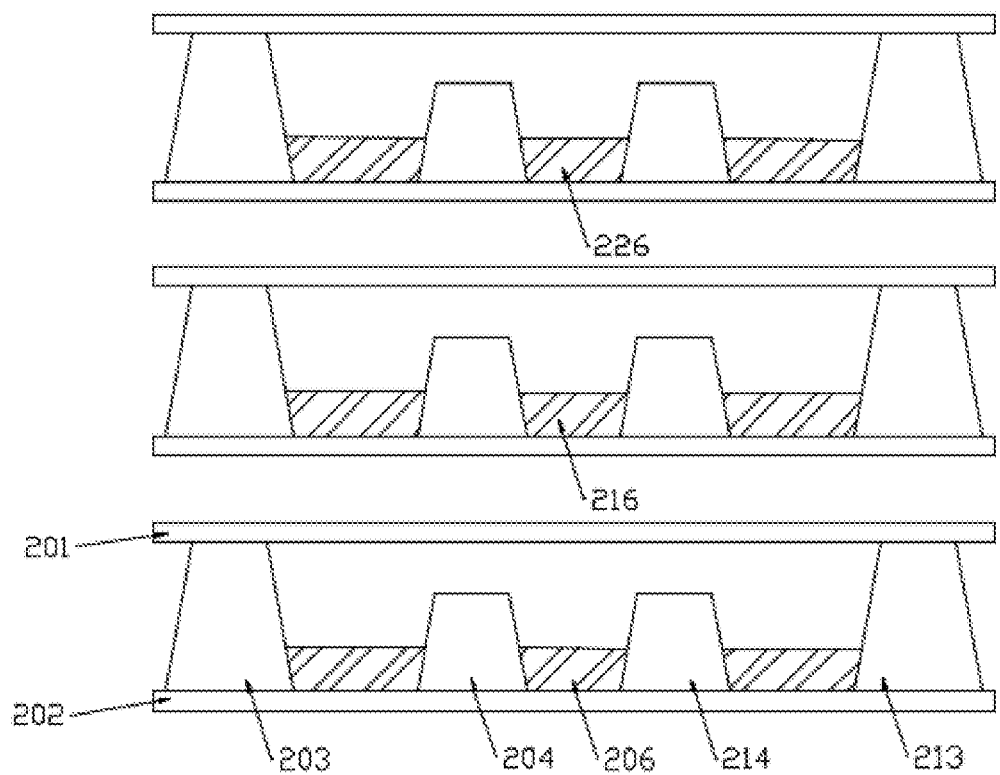
FIG. 3 is a schematic cross-sectional structure diagram of a liquid crystal display panel according to another embodiment of the present invention.

It is understood that, in an embodiment of the present invention, blocking performance of the retaining wall 206 can be continuously optimized. Therefore, based on the above embodiment, in another embodiment of the present invention, the retaining wall includes at least two layers of retaining walls, and heights of the at least two layers of retaining walls are the same. As shown in FIG. 3, which is a schematic cross-sectional structure diagram of a liquid crystal display panel according to an embodiment of the present invention. In this embodiment, multi-layer retaining walls are a retaining wall 206, a retaining wall 216, and a retaining wall 226, and heights of the retaining wall 206, the retaining wall 216, and the retaining wall 226 are the same. Since the multi-layer retaining walls are used in this embodiment, compared with a single-layer retaining wall, blocking performance is better, and there are fewer liquid crystals flowing downward due to gravity, and display performance of the liquid crystal display panel is better. The heights of the retaining walls of different layers are the same, which greatly reduces process difficulty and improves production efficiency. The height of the retaining wall 206 ranges from 0.5 um to 2.7 um, preferably 1 um to 1.9 um. In this preferred range, the retaining wall 206 can achieve the best blocking performance without generating a supporting performance.

Based on the above embodiment, in another embodiment of the present invention, the retaining wall includes at least two layers of retaining walls. A distance between the at least two layers of retaining walls and the bottom of the liquid crystal display panel and the height of the retaining wall 206 satisfy the following formula: H=A/D, where D is the distance of the retaining wall 206 from the bottom of the liquid crystal display panel, H is the height of the retaining wall 206, and A is a preset fixed value.

Figure 4:
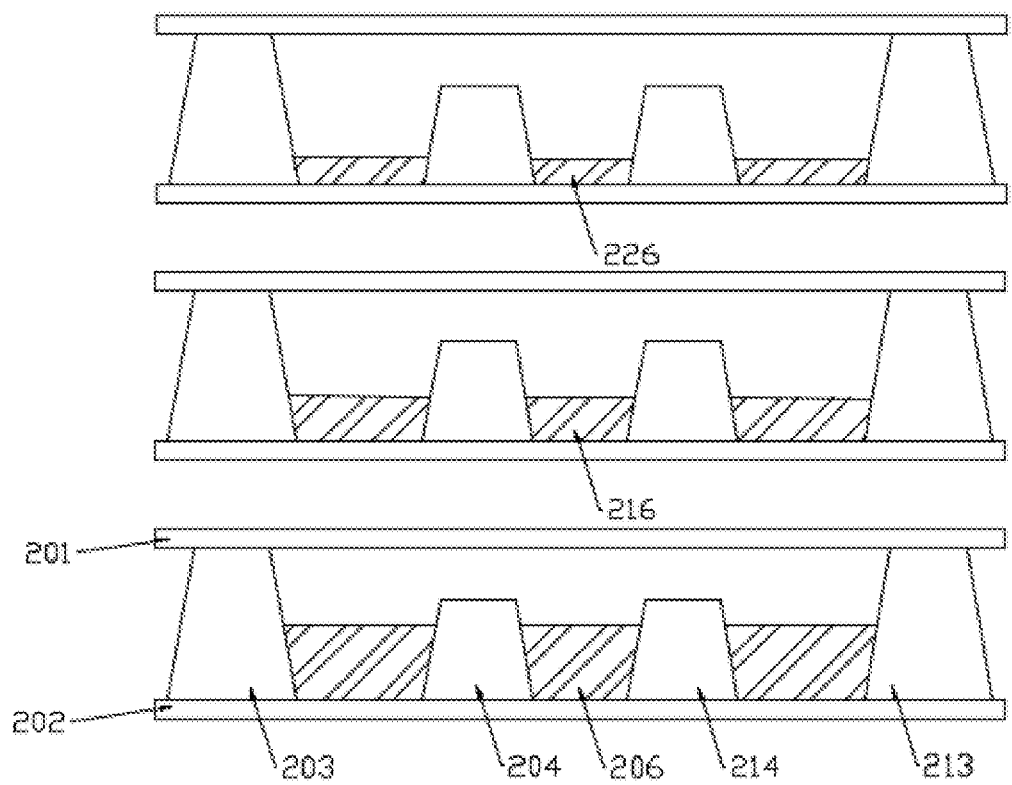
FIG. 4 is a schematic cross-sectional structure diagram of a liquid crystal display panel according to another embodiment of the present invention.

As shown in FIG. 4, which is a schematic cross-sectional structure diagram of a liquid crystal display panel according to another embodiment of the present invention. In this embodiment, the multi-layer retaining walls are a retaining wall 206, a retaining wall 216, and a retaining wall 226, respectively. The height of the retaining wall 206 is H1, and the distance from the bottom is D1. The height of the retaining wall 216 is H2, and the distance from the bottom is D2. The height of the retaining wall 226 is H3, and the distance from the bottom is D3, where H1>H2>H3, D1<D2<D3.

Since a liquid pressure on the liquid crystal is proportional to its depth, the closer it is to the bottom of the liquid crystal display panel, the greater the pressure of the liquid caused by gravity. The height H of the retaining wall 206 may increase as the distance D from the bottom decreases. That is, H is gradually changed in a proportional manner in a range of 0.5 um to 2.7 um. Preferably, H is gradually changed in a proportional manner in a range of 1 um to 1.9 um.

In addition, a width of the retaining wall 206 is also less than widths of the first spacer 203 and the second spacer 204. The widths of the first spacer 203 and the second spacer 204 are also called critical dimensions (CD), and a CD value of the first spacer 203 and the second spacer 204 is 25 um. The width of the retaining wall 206 ranges from 10 um to 25 um, and preferably 20 um.

Based on the above embodiment, in another embodiment of the present invention, material of the retaining wall 206 comprises a photoresist material. In the prior art, the first spacer 203 and the second spacer 204 are both photoresist materials, but their heights are different, and they respectively constitute a main spacer and an auxiliary spacer, which can use two transmittances of different areas of the same mask, and use the same process to mold at one time. In this embodiment, material of the retaining wall 206 also comprises a photoresist material. Obviously, the mask can be further optimized without adding other processes, so that there are three transmittances in different areas of the mask. That is, the first spacer 203, the second spacer 204, and the retaining wall 206 having different heights can be produced by using the same process at one time, which can improve production efficiency.

In another embodiment, cross-sectional shapes of the first spacer 203, the second spacer 204, and the retaining wall 206 include, but are not limited to, circular, rectangular, triangular, or trapezoidal shapes. This is good for practical production and good sealing.

In order to better implement the liquid crystal display panel in the embodiment of the present invention, based on the liquid crystal display panel, an embodiment of the present invention further provides a liquid crystal display device. The liquid crystal display device includes the liquid crystal display panel as described in the above embodiments.

It should be noted that only the above structure is described in the embodiment of the display panel. It can be understood that, in addition to the above structure, the liquid crystal display panel according to the embodiment of the present invention may further include any other necessary structures as required, and is not specifically limited herein.

By using the liquid crystal display panel described in the above embodiments, performance of the liquid crystal display device is further improved.

In the above embodiments, the description of each embodiment has its own emphasis. For a part that is not described in detail in an embodiment, reference may be made to the foregoing detailed description of other embodiments, and details are not described herein again.

In specific implementation, each of the above units or structures may be implemented as independent entities, or any combination may be implemented as the same or several entities. For specific implementation of the foregoing units or structures, reference may be made to the foregoing method embodiments, and details are not described herein again.

For specific implementation of the foregoing operations, refer to the foregoing embodiments, and details are not described herein again.

The liquid crystal display panel and the liquid crystal display device provided by the embodiments of the present invention have been described in detail above. Specific examples are used herein to explain the principles and embodiments of the present invention. The description of the above embodiments is only used to help understand the method of the present invention and its core idea. In addition, for those skilled in the art, according to the idea of the present invention, there may be changes in the specific implementation and application scope. In summary, the content of this specification should not be construed as a limitation on the present invention.

What is claimed is:

1. A liquid crystal display panel, comprising:
a display area;
a non-display area;
a substrate comprising a first substrate and a second substrate, the first substrate being disposed opposite to the second substrate;
a plurality of spacers comprising a plurality of first spacers and a plurality of second spacers, wherein the first spacers are disposed in the non-display area, at least a portion of each of the first spacers is in contact with the first substrate and the second substrate, and each of the second spacers is disposed between one of the first spacers and the display area; and
at least one retaining wall disposed between the one of the first spacers and one of the second spacers;
wherein a height of the one of the first spacers is equal to 2.52 μm, a height of the one of the second spacers is equal to 2.12 μm, a height of the at least one retaining wall ranges from 1 μm to 1.9 μm, widths of the one of the first spacers and the one of the second spacers are equal to 25 μm, and a width of the at least one retaining wall is equal to 20 μm;
wherein the at least one retaining wall comprises a first retaining wall, a second retaining wall, and a third retaining wall, a height of the first retaining wall is H1, a distance from the first retaining wall to a bottom of the liquid crystal display panel is D1, a height of the second retaining wall is H2, a distance from the second retaining wall to the bottom of the liquid crystal display panel is D2, a height of the third retaining wall is H3, a distance from the third retaining wall to the bottom of the liquid crystal display panel is D3, where H1>H2>H3, D1<D2<D3, and H1, H2, and H3 are gradually changed in a proportional manner in a range of 1 μm to 1.9 μm.

2. The liquid crystal display panel according to claim 1, wherein the at least one retaining wall is disposed in the non-display area.

3. The liquid crystal display panel according to claim 1, wherein material of the at least one retaining wall comprises a photoresist material.

4. The liquid crystal display panel according to claim 1, wherein the at least one retaining wall has a circular, rectangular, triangular, or trapezoidal shape.

5. A liquid crystal display device, comprising:
a liquid crystal display panel comprising:
a display area;
a non-display area;
a substrate comprising a first substrate and a second substrate, the first substrate being disposed opposite to the second substrate;
a plurality of spacers comprising a plurality of first spacers and a plurality of second spacers, wherein the first spacers are disposed in the non-display area, at least a portion of each of the first spacers is in contact with the first substrate and the second substrate, and each of the second spacers is disposed between one of the first spacers and the display area; and
at least one retaining wall disposed between the one of the first spacers and one of the second spacers;
wherein a height of the one of the first spacers is equal to 2.52 μm, a height of the one of the second spacers is equal to 2.12 μm, a height of the at least one retaining wall ranges from 1 μm to 1.9 μm, widths of the one of the first spacers and the one of the second spacers are equal to 25 μm, and a width of the at least one retaining wall is equal to 20 μm;
wherein the at least one retaining wall comprises a first retaining wall, a second retaining wall, and a third retaining wall, a height of the first retaining wall is H1, a distance from the first retaining wall to a bottom of the liquid crystal display panel is D1, a height of the second retaining wall is H2, a distance from the second retaining wall to the bottom of the liquid crystal display panel is D2, a height of the third retaining wall is H3, a distance from the third retaining wall to the bottom of the liquid crystal display panel is D3, where H1>H2>H3, D1<D2<D3, and H1, H2, and H3 are gradually changed in a proportional manner in a range of 1 µm to 1.9 µm.

6. The liquid crystal display device according to claim 5, wherein the at least one retaining wall is disposed in the non-display area.

7. The liquid crystal display device according to claim 5, wherein material of the at least one retaining wall comprises a photoresist material.

8. The liquid crystal display device according to claim 5, wherein the at least one retaining wall has a circular, rectangular, triangular, or trapezoidal shape.

\* \* \* \* \*